Oct. 14, 1941.   W. E. MANSFIELD   2,258,992
METHOD OF FORMING CONTACTS
Filed Sept. 16, 1939

INVENTOR
WILLIAM E. MANSFIELD
BY
*Hyde, Higley & Meyer*
ATTORNEYS

Patented Oct. 14, 1941

2,258,992

UNITED STATES PATENT OFFICE 2,258,992

METHOD OF FORMING CONTACTS

William E. Mansfield, Garfield Heights, Ohio, assignor, by mesne assignments, to Cleveland Tungsten, Inc., Cleveland, Ohio, a corporation of Ohio Application September 16, 1939, Serial No. 295,259

4 Claims. (Cl. 148—11.5)

My invention relates to the method of treating fabricated tungsten to improve its grain structure. It also relates to tungsten wires, rods or contacts and to the method of producing the same.

In the usual method of preparing fabricated tungsten, tungsten oxide is reduced in an atmosphere of hydrogen or by the carbon reduction process. The reduced powder thus produced is pressed into ingots and after presintering to permit handling is heated by an electric current to a temperature slightly below its melting point.

When it is desired to form rods or wires from tungsten which has been produced in such a manner for use in the commercial arts, the tungsten is drawn or swaged through suitable dies into the form of wires or rods. Wires or rods formed in such a manner have been utilized extensively as electrodes for tubes, such as radio tubes or tubes utilized for advertising or display purposes. When tungsten rods or wires are prepared in such a manner the tungsten assumes a laminated grain structure, the longitudinal grain boundaries of which have the tendency to develop into cracks when stress is applied. Consequently when the wire is utilized in evacuated tubes or those containing a gas, such as neon, air has a tendency to leak or diffuse into the tube between the laminations and destroys the vacuum or adversely affects the efficiency of the tube.

Contacts prepared from tungsten rods which have been fabricated in the manner specified are also expensive to produce or are not entirely satisfactory in service. For instance, in producing electrical contacts from such rods it has been the practice to prepare the contacts by repeatedly cutting portions of the desired thickness from the end of the rod or the rod may be hammered or rolled into a substantially flat strip of the desired thickness and the contacts punched therefrom.

When the contacts are cut from the end of the swaged rod they have been generally satisfactory although they have the tendency to split axially when welded or brazed to a suitable support. Considerable loss is also entailed by the cutting wheel in such a method and the scrap is in the form of a fine powder which is difficult to recover. Such a method of forming contacts is also somewhat time-consuming.

The method of punching contacts from a flattened strip is more expeditious and the scrap is easier to recover. In contacts formed by such a method, however, the laminated grain structure runs substantially parallel to the faces of the contact, and when the contacts are welded or brazed to a foundation metal, such as iron or steel, portions of the contact have the tendency to shale off in service.

It is the aim of the present invention to provide an improved method of treating fabricated tungsten to improve its grain structure and prevent shaling.

Another object of the invention is to provide an improved process of treating ductile tungsten wires or rods to improve their grain structure.

A further object of my invention is to provide a contact formed of a tungsten metal having improved grain structure.

Another object of my invention is to provide an improved process of producing contacts from ductile tungsten rods.

A still further object of my invention is to provide a nonbend tungsten rod having improved grain structure.

My invention will be better understood by reference to the accompanying drawing, in which Fig. 1 is a fabricated ductile tungsten rod formed by a drawing or swaging process;

Figure 1:
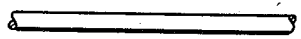
Figure 2:
Fig. 2 is a longitudinal cross sectional view of the rod shown in Fig. 1 on an enlarged scale, showing diagrammatically the laminated grain structure of the tungsten.
Figure 4:
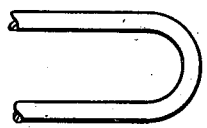
Fig. 4 is an elevational view of a nonbend wire or rod which has been treated by my improved process.

According to my invention the tungsten rod is fabricated in the usual manner, that is by heating the reduced and presintered metal to a temperature slightly below its melting point to prepare an ingot which is worked into the form of a rod or wire by forging, drawing or swaging, as shown in Fig. 1 in which the laminated grain structure runs longitudinally with the rod, as shown diagrammatically in Fig. 2. However, if desired, a wire or rod formed of the tungsten metal may be bent into any desired form as shown in Fig. 4 of the drawings. In such cases, however, the diameter of the rod must not exceed .093 of an inch as tungsten wires having a greater diameter cannot be bent.

Figure 3:
Fig. 3 is a view similar to Fig. 2 showing diagrammatically the grain structure of the tungsten after my improved treating process.

The rods or wires, thus formed, are placed in a container having a sufficiently high melting point to resist the heat required, such as tungsten or molybdenum, and are heated to a temperature of 900° to 1600° C. in a nonoxidizing atmosphere, such as hydrogen, although other nonoxidizing or inert gases may be employed, such as nitrogen, ammonia or the like. As a result of this treatment the tungsten loses its ductility and the grain structure is radically changed, as shown diagrammatically in Fig. 3 of the drawing. To form an electrode for tubes or the like, a glass bead 10 may be formed upon the rod 11 which is then inserted as an electrode in the tube, the glass of the tube being fused to the beading in the usual manner. When a shaped electrode or a nonbend rod or wire is desired, it is necessary to bend the metal prior to the heat treatment because after the heat treatment the tungsten loses its ductility and cannot be permanently bent. The term nonbend wire or rod when used in the specification and claims is intended to define a wire or rod which cannot be permanently deformed without breaking.

The time of treatment is of course dependent upon the temperature and the thickness of the wire or rod. It should be continued, however, until the metal loses its ductility. In treating ordinary electrodes for vacuum or gas filled tubes, I preferably treat the wire at a temperature of 1230° to 1260° C. for a period of approximately fifteen minutes. Rods or electrodes treated by my improved process will not split and consequently leakage or fusion of air or gases through the rod or electrode is eliminated.

Figure 5:
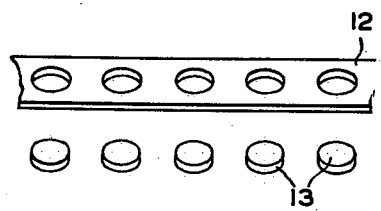
Fig. 5 is a perspective view of a flattened tungsten strip, showing contacts punched therefrom.

In forming contacts by my improved process the contact is first formed from the rod. For instance, contacts of the desired length may be cut from a round rod, such as shown in Fig. 1 of the drawing, or the rod may be swaged and formed into a substantially flat strip 12 of the desired thickness as shown in Fig. 5 and contacts 13 punched from the heated strip. I preferably utilize the latter method because the punching operation may be expeditiously performed and the scrap is in a more suitable form for recovery. The metal from which the punched disks are formed has also been subjected to more working or size reduction. In forming punched disks, however, it is essential to first punch the disks before they are treated by my improved process because it is commercially unfeasible to punch disks from nonductile rods.

Figure 6:
Fig. 6 is an enlarged cross sectional view of a contact punched from a flattened tungsten strip, showing diagrammatically the form of the grain structure.
Figure 7:
Fig. 7 is a view similar to Fig. 6, showing diagrammatically the form of the grain structure after my improved treating process.
Figure 8:
Fig. 8 is an elevational view of my improved contact welded or brazed to a suitable foundation metal.
Figure 9:
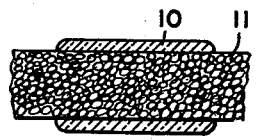
Fig. 9 is an enlarged cross sectional view of a tungsten rod and a glass bead formed thereon, showing the grain structure of the tungsten after my improved treating process.

As shown in Figs. 5 and 6 of the drawing, when the contacts 13 are punched, the laminated grain structure of the tungsten runs parallel to the faces of the contact. If the contacts are cut from the end of the rod, the laminated grain structure runs perpendicular to the faces and while my improved process is effective in improving the grain structure of such contacts, I preferably punch the disks from a flattened strip in the manner shown in Fig. 5 and then treat the punched disks. The contacts are then placed in a suitable container which may be formed of a metal, which is resistant to heat at the treating temperature, such as tungsten or molybdenum, and heated in a non-oxidizing atmosphere at a temperature of 900° to 1600° C. for a sufficient time to cause a rearrangement or dispersion of the grain structure of the metal.

In treating contacts I preferably utilize a temperature of from 1200° to 1600° C. for a period of time ranging from approximately fifteen minutes to one hour, depending upon the temperature. For instance, punched contacts such as shown in Fig. 6, when treated in an atmosphere of hydrogen for eighteen minutes at a temperature ranging from 1430° to 1495° C. have a dispersed grain structure and do not shale in service.

The term "fabricated ductile tungsten" when used in the specification and the claims refers to tungsten metal which has been heated to a sufficiently high temperature to render it coherent and which has been rendered ductile by working when hot, such as by forging, drawing or swaging.

What I claim is:

1. The method of forming contacts which comprises making disks from a fabricated ductile tungsten rod or strip, and then heating the disks at a temperature of 900° to 1600° C. in a nonoxidizing atmosphere for a sufficient length of time to cause a sufficient dispersion in the grain structure of the tungsten to render it nonductile.

2. The method of forming contacts which comprises punching disks from a fabricated ductile tungsten strip and then heating the disks at a temperature of 1200° to 1600° C. in a nonoxidizing atmosphere for a sufficient length of time to cause a sufficient dispersion in the grain structure of the metal to render it nonductile and eliminate shaling.

3. The method of forming contacts which comprises punching disks from a fabricated ductile tungsten strip and then heating the disks at a temperature of 900° to 1600° C. in a nonoxidizing atmosphere for sufficient time to cause a sufficient dispersion in the grain structure of the metal to render it nonductile and eliminate shaling, a sufficient time of treatment being dependent upon the temperature and being of the order of approximately eighteen minutes when the temperature ranges from 1430° to 1495° C.

4. The method of forming contacts which comprises cutting disks from a fabricated ductile tungsten rod and then heating the disks at a temperature of 900° to 1600° C. in a nonoxidizing atmosphere for a sufficient length of time to cause a sufficient dispersion in the grain structure of the tungsten to render it nonductile.

WILLIAM E. MANSFIELD.